Feb. 20, 1962  L. F. MARNETT ET AL  3,021,800
DOUGH KNOCKBACK DEVICE
Filed Feb. 20, 1958
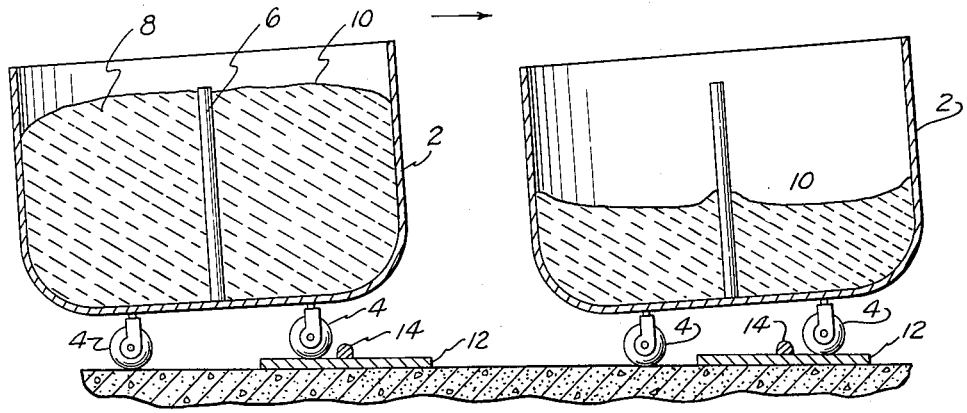
Fig. 1
Fig. 2
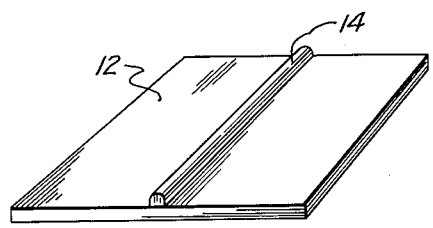
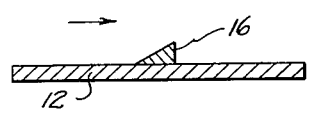
Fig. 3
INVENTORS
*Lawrence F. Marnett*
*William B. Hampton*
BY *Bailey, Stephens & Huettig*
ATTORNEYS

3,021,800
DOUGH KNOCKBACK DEVICE

Lawrence F. Marnett, Kansas City, Mo., and William B. Hampton, Oklahoma City, Okla., assignors to C. J. Patterson Company, Kansas City, Mo., a corporation of Missouri
Filed Feb. 20, 1958, Ser. No. 716,331
1 Claim. (Cl. 107—54)

This invention relates to the knocking back of a fermented dough in order to reduce its volume.

The object of the invention is to produce a means for releasing the gas from a fermented dough without cutting into the dough.

The means by which the objects of the invention are obtained are described more fully with reference to the accompanying drawings, in which:

FIGURE 1 is a cross-sectional view through bowls containing dough before and after the dough is knocked back;

FIGURE 2 is a perspective view of one form of floor plate used; and

FIGURE 3 is a cross-sectional view through a modified form of plate.

After the ingredients for making leavened dough have been mixed, the dough in its bowl or trough is set aside and allowed to rise by reason of the carbon dioxide formed during fermentation. As some of the gas bubbles become excessively large and the volume of the dough becomes so great, it is customary to use knives to cut into the dough or puncture the dough with the hands to release the gas. This all takes place before the dough is divided into individual pieces.

It has been discovered that this gas can be released by giving the bowl a sharp jolt.

As shown in FIGURE 1, the bowl 2 is movable on casters 4. The particular bowl illustrated has a center pin 6 as characterized by one particular type of a dough mixing process, as shown in Patterson Patent No. 2,869,484. The invention, however, is not dependent upon this form of bowl. Bowl 2 contains a fermented dough 8 which has risen to the upper level 10.

On the bakery floor is placed a plate 12 which has an abutment rod 14 welded thereto. The purpose of the plate 12 is to protect the surface of the floor against the impact of the bowl riding over the abutment 14. This abutment can take many different forms as indicated by the triangular abutment 16 shown in FIGURE 3. This triangular abutment provides an inclined face on which a caster can ride upwardly and then drop off suddenly.

The operation of the device is indicated by the two bowl positions shown in FIGURE 1. In any bakery, the bowls containing the risen dough are moved about. In the path of their movement is placed the abutment 14. The bowls weigh up to 600 pounds, and each bowl contains a dough weighing from 200 to 600 pounds. The height of the abutment 14 above the floor plate 12 is normally from one-half to one inch but can be higher. The leading bowl caster 4 rides over abutment 14 and drops suddenly giving the bowl a severe jolt. The dough in the bowl tears along the inside wall of the bowl and also tears away from the surface of pin 6 when such a type of bowl is used. This causes the larger bubbles to rupture and allows the escape of gas so that the dough level 10 quickly drops to the position shown on the right side of the figure. The weight of the mass of dough dropping in the upper portion of the bowl is great enough to compress and rupture the gas bubbles in the lower portion of the bowl so that the entire mass of dough is effectively degassed by this single operation. As indicated in FIGURE 1, one or more abutments 14 can be placed in the path of the bowl.

The invention has the advantage in that the effect of cutting back the dough is achieved by a very simple inexpensive means and without mutilating the dough by cutting with a knife or puncturing with the hands.

Having now described the means by which the objects of the invention are obtained, we claim:

A method of partially degasifying a risen leavened dough contained in a bowl and during bulk fermentation and before dividing the dough into loaf size weight pieces comprising sharply vertically jolting said bowl by pulling said bowl over a floor mounted abutment rod to produce a force sufficient to tear the dough away from the vertical bowl surfaces to which the dough has adhered and thus rupturing large gas bubbles so that the weight of the settling mass of dough ruptures additional gas bubbles to expel the gas from the ruptured bubbles from the dough.

References Cited in the file of this patent
UNITED STATES PATENTS

| | | |
|---|---|---|
| 155,807 | Moore et al. | Oct. 13, 1874 |
| 313,742 | Kintner | Mar. 10, 1885 |
| 317,630 | Cramer | May 12, 1885 |
| 354,634 | Grimm | Dec. 21, 1886 |
| 411,279 | Dampierre | Sept. 17, 1889 |
| 489,016 | Klenk | Jan. 3, 1893 |
| 718,926 | Gauron | Jan. 30, 1903 |
| 999,828 | McNaughton | Aug. 8, 1911 |
| 1,011,621 | Hollstein | Dec. 12, 1911 |
| 1,826,537 | Wilson | Oct. 6, 1931 |
| 2,000,848 | Kellett | May 7, 1935 |
| 2,023,478 | Kremer | Dec. 10, 1935 |
| 2,194,107 | Williams | Mar. 19, 1940 |
| 2,595,262 | Hood | May 6, 1952 |
| 2,622,718 | Feige | Dec. 23, 1952 |
| 2,667,285 | Misch | Jan. 26, 1954 |
| 2,839,776 | Nelson | June 24, 1958 |